United States Patent
Subramoney et al.

(10) Patent No.: US 6,662,274 B2
(45) Date of Patent: Dec. 9, 2003

(54) METHOD FOR USING CACHE PREFETCH FEATURE TO IMPROVE GARBAGE COLLECTION ALGORITHM

(75) Inventors: Sreenivas Subramoney, Palo Alto, CA (US); Richard L. Hudson, Northampton, MA (US)

(73) Assignee: Intel Corporation, Santa Clara, CA (US)

(*) Notice: Subject to any disclaimer, the term of this patent is extended or adjusted under 35 U.S.C. 154(b) by 352 days.

(21) Appl. No.: 09/886,068

(22) Filed: Jun. 20, 2001

(65) Prior Publication Data

US 2002/0199065 A1 Dec. 26, 2002

(51) Int. Cl.[7] ............................................. G06F 12/02
(52) U.S. Cl. ................. 711/137; 707/206; 711/155; 711/170; 711/204; 711/213; 711/217
(58) Field of Search ................... 707/206; 712/237, 712/239, 241; 711/137, 155, 170, 173, 204, 213, 217

(56) References Cited

U.S. PATENT DOCUMENTS

| | | | | | |
|---|---|---|---|---|---|
| 5,560,003 A | * | 9/1996 | Nilsen et al. | ............... | 707/206 |
| 5,687,368 A | * | 11/1997 | Nilsen | .................... | 707/103 R |
| 5,692,185 A | * | 11/1997 | Nilsen et al. | ............ | 707/104.1 |
| 5,940,621 A | * | 8/1999 | Caldwell | .................... | 717/156 |
| 6,542,991 B1 | * | 4/2003 | Joy et al. | .................... | 712/228 |
| 6,549,959 B1 | * | 4/2003 | Yates et al. | ................... | 710/22 |

* cited by examiner

*Primary Examiner*—Than Nguyen
(74) *Attorney, Agent, or Firm*—Blakely, Sokoloff, Taylor & Zafman LLP

(57) ABSTRACT

A method for creating a mark stack for use in a moving garbage collection algorithm is described. The algorithm of the present invention creates a mark stack to implement a MGCA. The algorithm allows efficient use of cache memory prefetch features to reduce the required time to complete the mark stack and thus reduce the time required for garbage collection. Instructions are issued to prefetch data objects that will be examined in the future, so that by the time the scan pointer reaches the data object, the cache lines for the data object are already filled. At some point after the data object is prefetched, the address location of associated data objects is likewise prefetched. Finally, the associated data objects located at the previously fetched addresses are prefetched. This reduces garbage collection by continually supplying the garbage collector with a stream of preemptively prefetched data objects that require scanning.

27 Claims, 2 Drawing Sheets

METHOD FOR USING CACHE PREFETCH FEATURE TO IMPROVE GARBAGE COLLECTION ALGORITHM

FIELD OF THE INVENTION

This invention relates generally to memory management in run-time environments, and more specifically to a garbage collection algorithm that uses cache memory features to reduce garbage collection time.

BACKGROUND OF THE INVENTION

The random access memory (RAM) of a computing system is a fixed size resource; currently a RAM size of 32 megabytes (Mb) is typical. The RAM must be managed properly to maintain system performance. In run-time environments such as Java or Microsoft CLI, memory management is handled by the system. Memory management includes a process known as "garbage collection". Garbage collection is a process with the aim of being as unobtrusive as possible in recycling memory. When a computer program is running it allocates and uses portions of memory on an ongoing basis. At some point the program may no longer need to use a particular portion of memory, e.g., the memory was allocated for a particular purpose that is no longer relevant. The portions that are no longer being used (garbage) are identified (collected) so that they can be reclaimed for future allocation. The garbage collection process taxes the central processing unit (CPU) and degrades system performance as perceived by the application. It is, therefore, highly desirable to reduce the time taken to reclaim unused portions of memory.

Typical computing systems have a cache memory between the CPU and main memory. The cache is small, typically 2 Mb or less, compared to main memory, that is typically 128 Mb. The cache is used to store, and provide fast access to data from the most recently used memory locations. The cache is also much faster than main memory. This allows data stored to cache to be provided more quickly. Most modern computing systems have software mechanisms (CPU instructions) to explicitly manage the cache.

Garbage collection takes place in main memory, but because the cache acts as a bottleneck to the processing of memory data, the way cache is managed is important to reducing garbage collection time. Typically objects being evacuated from old space are in linked data structures, which do not exhibit locality that can be exploited using cache-enhancing instructions such as "prefetch" or automatic prefetch hardware. This results in poor cache performance as described below.

A popular garbage collection algorithm for use in run-time environments is the moving garbage collection algorithm (MGCA). The MGCA examines a memory block that may typically be from 1 Mb to 4 gigabytes (Gb) in size. The MGCA determines which memory data from the block is in use (live data) and which is garbage. As the name implies, MGCAs move all live data to new consecutive memory locations. This compacts the live data into a smaller space than when it was co-located with the garbage. Once the live data is copied to new locations the entire block can be reclaimed and reallocated.

A typical MGCA has three phases: mark, repoint, and copy. In the mark phase the live objects, those to be moved to a new memory location, are determined. At this point new memory locations for the data objects are also determined. In the repoint phase the live objects are examined and their references are changed so that they refer to new memory locations. In the copy phase, the contents of each live object are copied to the new memory location. Many MGCAs implement a Cheney Scanning algorithm. The Cheney Scanning algorithm identifies a memory location to which live data may be copied (TO space), and then determines a "root set" of live data in FROM space. The root set typically includes references in CPU registers, thread stacks, and globally accessible locations. The root set is then copied to new memory locations in TO space. Once copied, each object is scanned iteratively to determine associated memory data (i.e., reachable objects). If a reachable object is determined a new memory location is allocated and the reachable object is copied to the new memory location in TO space. The copied associated object will likewise, in turn, be scanned to determine associated memory data. This process is continued until the transitive closure of the root set is reached (i.e., all reachable objects have been identified and copied). In the Cheney Scanning algorithm the FROM space copies of live objects go through the cache, at least once, when they are being identified and copied to TO space. The TO space copies of live objects go through the cache twice, once when the object is copied to TO space, and once when the object is scanned to determine associated objects. The design and structure of the Cheney Scanning algorithm precludes the maximal use of cache prefetch features to reduce the garbage collection time.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

An improved moving garbage collection algorithm is described. The algorithm allows efficient use of cache memory prefetch features to reduce the required time for garbage collection. Data prefetch is a technique that attempts to minimize the time a processor spends waiting for data. Data following the one currently being executed are loaded into a prefetch queue when the processor's external bus is otherwise idle. This is known as automatic prefetching and is performed transparently by the hardware. Software prefetching involves explicit CPU instructions to prefetch data from a known address. The algorithm of the present invention provides an auxiliary data structure known as a mark stack to allow the use of the CPU's software cache memory prefetch features.

Figure 1:
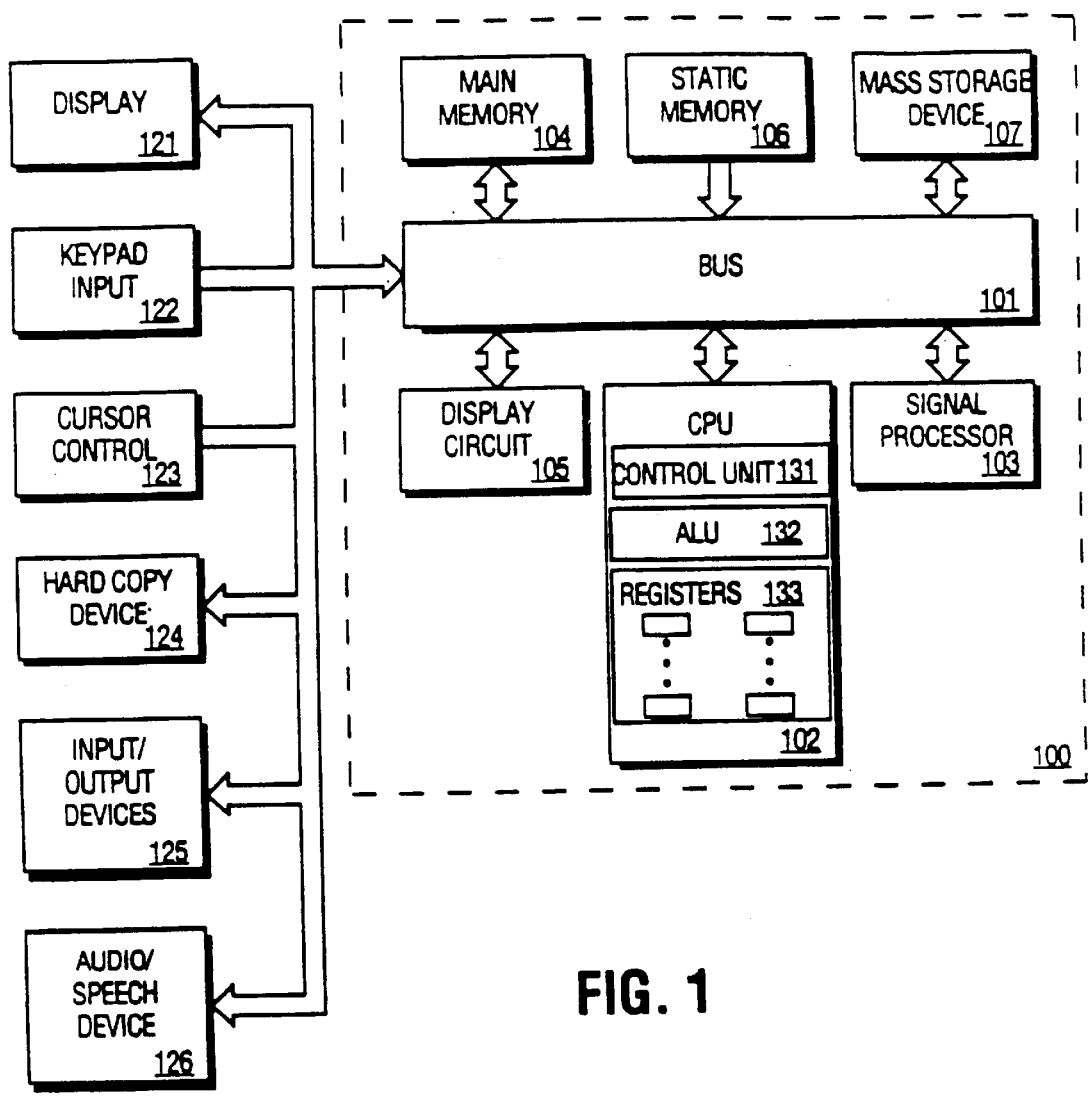
FIG. 1 is an illustration of an exemplary computing system for implementing the moving garbage collector of the present invention.

FIG. 1 is a diagram illustrating an exemplary computing system 100 for implementing the MGCA of the present invention. Typically, computing systems provide a prefetch feature. The creation of a mark stack and the use of cache memory prefetch features described herein can be implemented and utilized within computing system 100, which can represent a general-purpose computer, portable computer, or other like device. The components of computing system 100 are exemplary in which one or more components can be omitted or added. For example, one or more memory devices can be utilized for computing system 100.

Referring to FIG. 1, computing system 100 includes a central processing unit 102 and a signal processor 103 coupled to a display circuit 105, main memory 104, static memory 106, and mass storage device 107 via bus 101. Computing system 100 can also be coupled to a display 121, keypad input 122, cursor control 123, hard copy device 124, input/output (I/O) devices 125, and audio/speech device 126 via bus 101.

Bus 101 is a standard system bus for communicating information and signals. CPU 102 and signal processor 103 are processing units for computing system 100. CPU 102 or signal processor 103 or both can be used to process information and/or signals for computing system 100. CPU 102 includes a control unit 131, an arithmetic logic unit (ALU) 132, and several registers 133, which are used to process information and signals. Signal processor 103 can also include similar components as CPU 102.

Main memory 104 can be, e.g., a random access memory (RAM) or some other dynamic storage device, for storing information or instructions (program code), which are used by CPU 102 or signal processor 103. Main memory 104 may store temporary variables or other intermediate information during execution of instructions by CPU 102 or signal processor 103. Static memory 106, can be, e.g., a read only memory (ROM) and/or other static storage devices, for storing information or instructions, which can also be used by CPU 102 or signal processor 103. Mass storage device 107 can be, e.g., a hard or floppy disk drive or optical disk drive, for storing information or instructions for computing system 100.

Display 121 can be, e.g., a cathode ray tube (CRT) or liquid crystal display (LCD). Display device 121 displays information or graphics to a user. Computing system 100 can interface with display 121 via display circuit 105. Keypad input 122 is an alphanumeric input device with an analog to digital converter. Cursor control 123 can be, e.g., a mouse, a trackball, or cursor direction keys, for controlling movement of an object on display 121. Hard copy device 124 can be, e.g., a laser printer, for printing information on paper, film, or some other like medium. A number of input/output devices 125 can be coupled to computing system 100.

The automated process of garbage collection in accordance with the present invention can be implemented by hardware and/or software contained within computing system 100. For example, CPU 102 or signal processor 103 can execute code or instructions stored in a machine-readable medium, e.g., main memory 104.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

Figure 2:
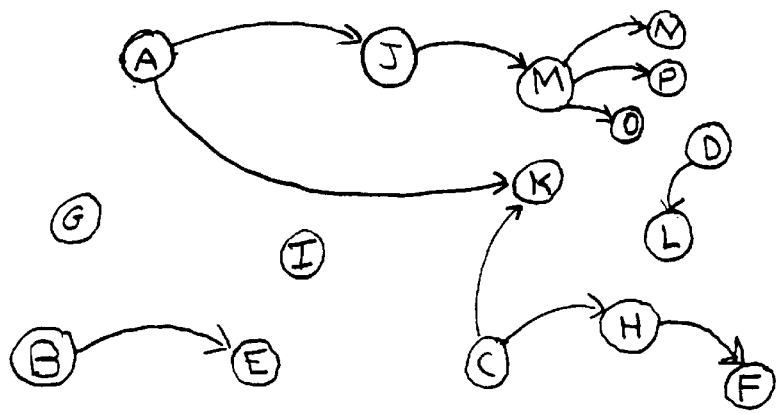
FIG. 2 illustrates the creation and use of a mark stack to leverage cache memory prefetch capability.

As described above, a typical MGCA includes a mark phase in which live objects are determined. An embodiment of the present invention uses a mark stack to implement the mark phase of garbage collection. The use of memory prefetch features allows the completion of the mark phase in less time, resulting in faster garbage collection. FIG. 2 describes the use of a mark stack to leverage cache memory prefetch capability.

In FIG. 2 data objects are shown as A through O. The arrows are references that indicate an association between the data objects. For example, A has an association with both J and K, and, therefore holds references to J and K. The mark stack initially includes references to data objects of the root set as described above. If, for example the root set comprises A through D, then references to A through D as well as references to any reachable data objects will be included in the mark stack as the mark phase progresses. As shown in FIG. 2, J and K are associated with A; E is associated with B; H and K are associated with C; L is associated with D; F is associated with H; M is associated with J; and N, O, and P are associated with M. This means that the transitive closure of the root set A through D includes A, B, C, D, E, F, H, J, K, L, M, N, O, and P. Note that data object K, associated with both A and C is only included once. This transitive closure set comprises those data objects that need to persist across a garbage collection and constitutes the set of live objects. At the time a data object is added to the mark stack, a new memory location is determined for the data object because it is known that the data object must persist across a garbage collection. Data objects G, and I will not be copied to new memory locations and are, therefore, treated as garbage.

As shown at 205, references to data objects A through D are initially included in the mark stack and the actual contents of data objects A through D are stored to cache memory as a result of the inclusion. Pointer 1, located at index 1, is a scanning pointer to indicate that data object A (i.e., the actual contents) will be examined for associated data objects. Pointer 2, located at index 5, is a free pointer indicating the next free index in the mark stack. When A is examined, the memory location of A's associations must be determined. Once this is done the memory location is examined to determine A's associations. At this point it is also determined if any of A's associations already appear in the mark stack. This is recorded within the same object. When A is examined, the associated data objects J and K will be determined and references to J and K will be included in the mark stack at indices 5 and 6 respectively as shown at 210.

At this point cache memory prefetch instructions can be used to speed up the creation of the mark stack and thus reduce the time for garbage collection. It is now known that the transitive closure set will include data object J that is referenced in the mark stack at some future index, in this case index 5. This data object is located at a certain index ahead of the scan pointer, in this case 4 (i.e., the scan pointer 1 is located at index 1 and the data object reference is located at index 5). Therefore a prefetch instruction to bring the contents of data object referenced at an index 4 ahead of the scan pointer 1, (i.e., data object J) into the cache memory is issued. This ensures that when scanning pointer 1 gets to index 5 there will be a data object to examine. This eliminates the need to wait on the cache and thus allows the construction of the mark stack in less time. This, in turn, significantly reduces the time required for garbage collection, as typical cache wait-time is several CPU cycles. Of course the reference of the data object whose contents is to be prefetched may be at an index any specified distance ahead of the scan pointer. This distance is not critical and may depend on a particular implementation. The idea is that it has already been determined that the index references a data object that is part of the transitive closure set.

In an alternative embodiment, additional prefetch instructions may be issued to further reduce the time required to complete the mark stack, as described below.

As shown at 210, scan pointer 1 has moved to B at index 2 and free pointer 2 has moved to index 7 (i.e., the next free index in the mark stack). While B is being examined for associated objects, a prefetch instruction to bring the contents of the data object referenced at an index a specified distance ahead of the scan pointer is issued as described above. That is, the scanner is at index 2 and it is known that index 6 holds a reference to a data object that is included in the set of all reachable objects (the transitive closure set). Therefore, the contents of the data object, referenced at index 6, is prefetched. However, it is also known that the contents of data objects referenced prior to index 6 are already available in cache memory. It is possible then to not only issue the prefetch for the contents of the data object referenced at index 6, but also issue a prefetch for the address locations of the data object referenced at index 5, for example. Again the actual distance ahead of the scan pointer is not important the idea being that if the contents of a data object that is referenced at index X is being prefetched, then the contents of a data object referenced at index some Y, where Y is less than X, is already available.

At 215 the examination of B is complete and a reference to data object E has been included in the mark stack at index 7. The scan pointer 1 has moved to C, at index 3, and the free pointer 2 has moved to index 8. So while C is being examined, the contents of data object E (4 ahead of the scan pointer) is being prefetched. The address locations for associated data of data object K (3 ahead of the scan pointer) can also be prefetched.

The process continues as shown at 220 in which C has been examined and reference to data object H has been added to the mark stack at index 8. Data object C is also associated with data object K, but reference to data object K has already been included in the mark stack due to data object K being associated with data object A. The scan pointer 1 has moved to D, at index 4, and the free pointer 2 has moved to index 9. At this point the contents of D are being examined. The contents of data object H (indexed 4 ahead of the scan pointer) are being prefetched. The contents of data object E (indexed 3 ahead of the scan pointer) have already been prefetched, and the address locations of data object E are being prefetched. The contents and the address locations of data object K (indexed 2 ahead of the scan pointer) have already been prefetched. It is, therefore, possible at this time to prefetch the actual associations of data object K, thus further reducing time spent waiting on the cache memory.

The contents of the mark stack at this point is as shown at 225. Data object D has been examined and reference to data object L has been added to the mark stack. The scan pointer 1 has been moved to J, at index 5, and the free pointer 2 has been moved to index 10. Through use of the prefetch commands described above, the cache memory at this point may contain the contents of all data objects that are referenced a specified distance, X, ahead of the scan pointer. For example the cache memory at 225 may contain the contents of data objects J, K, E, and H. The cache memory may also contain the address locations of data objects associated with data objects that are referenced a specified distance, Y, ahead of the scan pointer, where Y is less than X. For example, the cache memory may contain the address locations of associated data for data objects J, K, and E. The cache memory may also contain the actual associations of data objects that are referenced a specified distance, Z, ahead of the scan pointer, where Z is less than Y. For example, the cache memory may contain data indicating the associations of data objects J, and K.

Through use of the prefetch commands described above, the data necessary to examine a given data object and construct the mark stack is available in cache at the time the scan pointer reaches the particular data object. This reduces the time spent waiting for the required data to be available at the cache for processing. This significant reduction in the time required to produce a mark stack containing the transitive closure set thus, reduces the time required for garbage collection.

At 230, data object J has been examined and reference to data object M has been added to the mark stack at index 10. The scan pointer 1 has moved from J, at index 5, through K and E to H at index 8. The examination of data objects K and E did not change the contents of the mark stack because both K and E do not have associations. At this time the actual contents of data object M is being prefetched, as are the location address for associated data objects and the associated data objects themselves.

At 235, data object H has been examined and reference to data object F has been added to the mark stack. The scan pointer 1 has moved from H, at index 8, through L, at index 9, to M at index 10. Again, the examination of data object L did not change the contents of the mark stack because L does not have associations.

At 240, data object M has been examined and reference to data objects N, O, and P have been included in the mark stack. Data objects F, N, O, and P do not reference any other data objects, therefore, as shown at 240, scan pointer 1 has moved to index 15. The free pointer 2 is also at index 15 and therefore, the mark stack is complete.

The repoint and copy phase that includes updating the contents of each data object to reflect its new address and copying all live data from the FROM space to the TO space may now be completed in accordance with the prior art.

The algorithm of the present invention, attached as Appendix A, creates a mark stack to implement a MGCA. The time required to complete the mark stack is significantly reduced by extensive use of the cache memory instruction prefetch capabilities of the CPU. Instructions are issued to prefetch data objects that will be examined in the future, so that by the time the scan pointer reaches the data object, the cache lines for the data object are already filled. At some point after the data object is prefetched, the address location of associated data objects is likewise prefetched. Finally, the associated data objects located at the previously fetched addresses are prefetched. This reduces garbage collection time by continually supplying the garbage collector with a stream of preemptively prefetched data objects that require scanning.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
  (a) placing references to a root set of data objects, each data object having a contents, into a reference array such that the contents of each data object is stored to memory;
  (b) examining the contents of a particular data object such that associated data objects are determined;
  (c) placing a reference to the associated data objects in the reference array;
  (d) prefetching the contents of a future-referenced data object to cache memory, the data object referenced a specified distance ahead of the particular data object in the reference array; and (e) repeating operations (b) through (d) such that the transitive closure set of the root set of data objects is determined.

2. The method of claim 1 wherein operation (d) further includes:

prefetching address locations of data objects associated with a data object referenced a second specified distance ahead of the particular data object, the second specified distance less than the specified distance.

3. The method of claim 2 wherein operation (d) further includes:

prefetching the actual contents of data objects associated with the particular data object referenced a third specified distance ahead of the particular data object, the third specified distance less than the second specified distance.

4. The method of claim 1 wherein the root set includes data objects referenced in central processing units, thread stacks, and globally accessible locations of a computing system.

5. The method of claim 4 wherein the specified distance is determined based upon performance parameters of the computing system.

6. The method of claim 5 wherein the computing system operates in a run-time environment.

7. The method of claim 6 wherein the run-time environment is selected from the group consisting of JAVA and CLI.

8. The method of claim 7 implemented as the mark phase of a moving garbage collection algorithm.

9. The method of claim 7 implemented as the mark phase of a non-moving garbage collection algorithm.

10. A machine-readable medium that provides executable instructions, which when executed by a processor, cause the processor to perform a method, the method comprising:

(a) placing references to a root set of data objects, each data object having a contents, into a reference array such that the contents of each data object is stored to memory;

(b) examining the contents of a particular data object such that associated data objects are determined;

(c) placing a reference to the associated data objects in the reference array;

(d) prefetching the contents of a future-referenced data object to cache memory, the data object referenced a specified distance ahead of the particular data object in the reference array; and (e) repeating operations (b) through (d) such that the transitive closure set of the root set of data objects is determined.

11. The machine-readable medium of claim 10 wherein operation (d) further includes:

prefetching address locations of data objects associated with a data object referenced a second specified distance ahead of the particular data object, the second specified distance less than the specified distance.

12. The machine-readable medium of claim 11 wherein operation (d) further includes:

prefetching the actual contents of data objects associated with the particular data object referenced a third specified distance ahead of the particular data object, the third specified distance less than the second specified distance.

13. The machine-readable medium of claim 10 wherein the root set includes data objects referenced in central processing units, thread stacks, and globally accessible locations of a computing system.

14. The machine-readable medium of claim 13 wherein the specified distance is determined based upon performance parameters of the computing system.

15. The machine-readable medium of claim 14 wherein the computing system operates in a run-time environment.

16. The machine-readable medium of claim 15 wherein the run-time environment is selected from the group consisting of JAVA and CLI.

17. The machine-readable medium of claim 16 implemented as the mark phase of a moving garbage collection algorithm.

18. The machine-readable medium of claim 16 implemented as the mark phase of a non-moving garbage collection algorithm.

19. An apparatus comprising:

a register to hold a reference array, the reference array referencing a root set of data objects, each data object having a contents;

a cache memory to store the contents of each data object; and a processor to perform the operations of (a) examine the contents of a particular data object such that associated data objects are determined, (b) place a reference to the associated data objects in the reference array, (c) prefetch the contents of a future-referenced data object to the cache memory, the future-referenced data object referenced a specified distance ahead of the particular data object in the reference array, and (d) repeat operations (a) through (c) such that the transitive closure set of the root set of data objects is determined.

20. The apparatus of claim 19 wherein operation (c) further includes:

prefetching address locations of data objects associated with a data object referenced a second specified distance ahead of the particular data object, the second specified distance less than the specified distance.

21. The apparatus of claim 19 wherein operation (c) further includes:

prefetching the actual contents of data objects associated with the particular data object referenced a third specified distance ahead of the particular data object, the third specified distance less than the second specified distance.

22. The apparatus of claim 19 wherein the root set includes data objects referenced in central processing units, thread stacks, and globally accessible locations of a computing system.

23. The apparatus of claim 22 wherein the specified distance is determined based upon performance parameters of the computing system.

24. The apparatus of claim 23 wherein the computing system operates in a run-time environment.

25. The apparatus of claim 24 wherein the run-time environment is selected from the group consisting of JAVA and CLI.

26. The apparatus of claim 25 implemented as the mark phase of a moving garbage collection algorithm.

27. The apparatus of claim 25 implemented as the mark phase of a non-moving garbage collection algorithm.

* * * * *